W. C. STENGER.
MICROMETER.
APPLICATION FILED APR. 27, 1917.
1,299,256.
Patented Apr. 1, 1919.
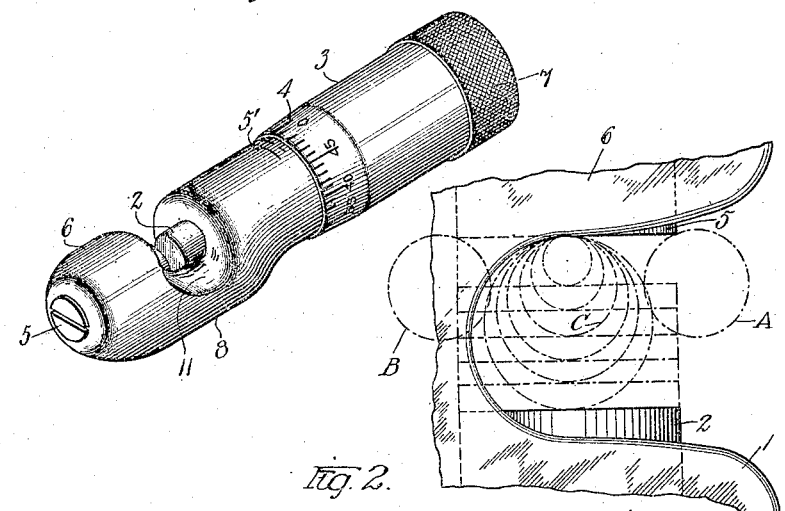
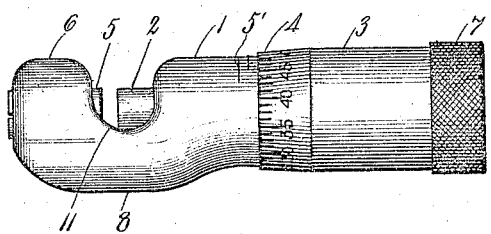
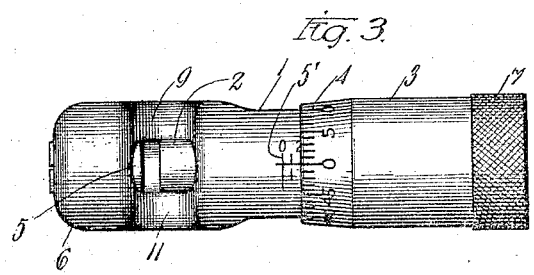
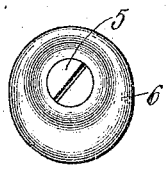
Witnesses
Robert F. Weir
Arthur W. Parkins
W. C. Stenger
Inventor
B. Singly Atty

UNITED STATES PATENT OFFICE.

WILLEBALD C. STENGER, OF CHICAGO, ILLINOIS.

MICROMETER.

1,299,256. Specification of Letters Patent. Patented Apr. 1, 1919.

Application filed April 27, 1917. Serial No. 164,886.

*To all whom it may concern:*

Be it known that I, WILLEBALD C. STENGER, a citizen of the United States of America, resident of Chicago, county of Cook, State of Illinois, (post-office address is 64 E. Van Buren street, Chicago, Illinois,) have invented new and useful Improvements in Micrometers, of which the following is a specification.

The invention relates to improvements in micrometers, and especially to micrometers for measuring the thickness of small articles of cylindrical cross section and of relatively soft structure, violin strings, wires and the like.

An object of the present invention is to improve the general structure of micrometers by reducing the size of the mouth in which the article is held, and by guiding the micrometer spindle in the yoke of the instrument.

Another object of the invention is to arrange the spindle or stem with respect to the yoke, so that in measuring a cylindrical article immaterial of the thickness of the same, the diameter of the article to be measured is located in alinement with the axis of the spindle.

Another object of the invention is to provide a micrometer in which the article to be measured can not slip from one side of the spindle to the other side through the interspace between spindle and anvil.

With these and other objects in view an embodiment of the micrometer has been illustrated in the accompanying drawings, wherein—

Figure 1 is a perspective view of a micrometer of this kind.

Fig. 2 is a side view of the same.

Fig. 3 is a front elevation,

Fig. 4 is a top plan view, and

Fig. 5 is a diagrammatic enlarged view of the yoke and several cylindrical articles in measuring position.

The internal parts of the micrometer which are to be actuated to bring the spindle to measuring position or withdraw the same therefrom are in no way different from ordinary micrometer parts, and therefore they are not illustrated in the drawing.

The shank 1 contains the movable spindle 2 which may be displaced longitudinally with respect to the shank by rotation of the barrel 3. The upper edge of the barrel is beveled in a well-known way and is provided with graduation marks 4, which in coöperation with the graduation marks 5' on the shank 1 indicate with exactness the distance between the upper surface of the spindle 2 and the lower surface of the anvil 5 supported by the transverse arm 6. The rotation of the barrel 3 and simultaneous longitudinal displacement of the spindle are effected by rotating the knurled cap 7 at the lower end of the barrel. The arm 6 and the end of the barrel 3 are connected by a yoke shaped portion 8 integral with both of the parts last mentioned.

This yoke portion is provided on its inner or mouth surface, that is, the surface which in side elevation appears as a concave surface, with a groove 9 of arcuate cross section adapted to receive a part of the spindle which has a sliding fit in the groove. The inner surface 11 of the yoke recedes nowhere from the spindle sufficiently far to leave a gap between the spindle and the said surface. It is therefore impossible that in the use of the device the article to be measured passes or slips through the interspace between the anvil and the spindle toward the yoke. This feature is particularly of value in measuring articles which have not the rigidity of metal, as for instance, in testing the thickness of violin strings.

In measuring the thickness of articles, and especially of articles which may be readily deformed, like violin strings, the pressure exerted at the spindle against the articles must not be excessive, otherwise the semi-rigid flexible string will be compressed and no exact measurement is possible. If, however, a slight pressure only is exerted against the surface of the string there is a possibility that the string will slip through the space between anvil and spindle and the use of the device would be rendered difficult. This difficulty is avoided owing to the fact that the spindle 2 is guided in a groove 9 of the yoke 8 connecting the barrel 3 with the anvil support 6.

If an article of cylindrical cross section is to be tested there is a possibility that upon insertion of the cylindrical article between the two testing parts to an insufficient depth, this article will not be measured on a true diameter, but only on a cord, as shown in Fig. 5 at A. It is also obvious that a cord only would be measured, instead of a true diameter, if the article would partly slip through the interspace between anvil and spindle so that a larger portion of the cross section would be located outside the interspace than in said interspace, as indicated at B, Fig. 5. In order to avoid these disadvantages which would result in inexact measurement, the edge of the yoke connecting the anvil support with the barrel is shaped so that cylindrical articles inserted in the interspace between anvil and spindle will be held from further insertion, when a true diameter is in alinement with the axis of the spindle, as shown at C. From Fig. 5 it will be noted that this edge is arcuate and that the curve is selected so that it will constitute a bar to the insertion (beyond a certain depth) of cylinders to which the upper surface of the spindle and lower surface of the anvil are tangential planes. The edge of the yoke may therefore be defined as the curve which forms a tangential to all of those circles which have their center on a line connecting the center of the top of the spindle with the center of the bottom of the anvil surface, each of these circles being in contact with the center of the anvil. The form of this arcuate edge is therefore adapted to define the exact measuring position of articles of cylindrical cross section, by preventing the insertion of these articles to a depth, at which a true diameter would be out of alinement with the axis of the spindle.

It will also be noted that the micrometer owing to this compendious arrangement of yoke and barrel has a pleasing appearance, takes very little space and is protected against the entry of foreign bodies between certain parts of the same.

I claim:

1. In a micrometer, the combination of a shank, a barrel, a spindle movable in said barrel, an anvil, and a yoke connecting the anvil with said barrel, the inner edge of the yoke being shaped so as to determine the insertion of cylindrical bodies between said spindle and anvil when said cylindrical bodies are held transversely to a line connecting the centers of said anvil and said spindle in a position in which a diameter of the cross-section of said cylindrical bodies will be located in said connecting line.

2. In a micrometer, the combination of a shank, a barrel surrounding said shank, a spindle movable in said barrel, an anvil in axial alinement with said spindle but spaced therefrom, and a yoke connecting the anvil with said shank, the inner edge of said yoke, as seen in side view, having the shape of a curved tangential to circles which have their centers on the common axis of said anvil and spindle, and which have one point in contact with the center of the surface of the anvil directed toward said spindle.

In testimony whereof I affix my signature in presence of two witnesses.

WILLEBALD C. STENGER.

Witnesses:
HANS VON RENISPERG,
ELMER H. HEITMANN.